United States Patent
Okuyama et al.

(10) Patent No.: US 10,654,212 B2
(45) Date of Patent: May 19, 2020

(54) LIQUID BLOW MOLDING APPARATUS AND LIQUID BLOW MOLDING METHOD

(71) Applicants: Yuichi Okuyama, Tokyo (JP); Kenichi Suyama, Tokyo (JP)

(72) Inventors: Yuichi Okuyama, Tokyo (JP); Kenichi Suyama, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 0 days.

(21) Appl. No.: 15/570,695

(22) PCT Filed: Mar. 10, 2016

(86) PCT No.: PCT/JP2016/001350
§ 371 (c)(1),
(2) Date: Dec. 14, 2017

(87) PCT Pub. No.: WO2016/174808
PCT Pub. Date: Nov. 3, 2016

(65) Prior Publication Data
US 2018/0354187 A1 Dec. 13, 2018

(30) Foreign Application Priority Data
Apr. 30, 2015 (JP) ................................ 2015-093369

(51) Int. Cl.
 *B29C 49/42* (2006.01)
 *B29C 49/46* (2006.01)
 (Continued)

(52) U.S. Cl.
 CPC .............. *B29C 49/42* (2013.01); *B29C 49/06* (2013.01); *B29C 49/12* (2013.01); *B29C 49/28* (2013.01);
 (Continued)

(58) Field of Classification Search
 CPC .......... B29C 49/06; B29C 49/12; B29C 49/28
 (Continued)

(56) References Cited

U.S. PATENT DOCUMENTS 3,993,427 A * 11/1976 Kauffman ............... B29C 49/58
 425/529
4,036,573 A    7/1977 Kauffman et al.
 (Continued)

FOREIGN PATENT DOCUMENTS

CN    104114348    10/2014
JP    H04-131222 A    5/1992
 (Continued)

OTHER PUBLICATIONS

Feb. 3, 2019 Office Action issued in Chinese Patent Application No. 201680024955.8.
 (Continued)

*Primary Examiner* — Seyed Masoud Malekzadeh
*Assistant Examiner* — Guy F Mongelli
(74) *Attorney, Agent, or Firm* — Oliff PLC (57) ABSTRACT

A liquid blow molding apparatus including a support pin disposed in a blow mold. The support pin includes a head and a shaft. The support pin is configured to define a gap between the head and a bottom of the preform in a state where the preform is placed in the blow mold and is also configured to support the bottom of the preform at a time of a molding process and to be displaced downward in accordance with deformation of the preform.

4 Claims, 5 Drawing Sheets

(51) Int. Cl.
  *B29C 49/06* (2006.01)
  *B29C 49/12* (2006.01)
  *B29C 49/28* (2006.01)
  *B29L 31/00* (2006.01)

(52) U.S. Cl.
  CPC ...... *B29C 49/46* (2013.01); *B29C 2049/1219* (2013.01); *B29C 2049/4664* (2013.01); *B29L 2031/7158* (2013.01)

(58) Field of Classification Search
  USPC .......................................................... 264/532
  See application file for complete search history.

(56) References Cited

U.S. PATENT DOCUMENTS

| | | | | |
|---|---|---|---|---|
| 4,214,860 | A * | 7/1980 | Kleimenhagen | B29C 49/12 425/149 |
| 4,233,021 | A * | 11/1980 | Spurr | B29C 49/062 264/538 |
| 4,547,333 | A * | 10/1985 | Takada | B29C 49/12 264/531 |
| 4,615,667 | A * | 10/1986 | Roy | B29C 49/0073 264/526 |
| 5,290,506 | A * | 3/1994 | Yokobayashi | B29C 49/12 264/520 |
| 5,403,177 | A * | 4/1995 | Priest | B29C 49/062 425/529 |
| 5,785,921 | A * | 7/1998 | Outreman | B29C 49/48 264/529 |
| 6,576,171 | B1 * | 6/2003 | Devenoges | B29C 49/12 264/40.1 |
| 2006/0138696 | A1 * | 6/2006 | Weinmann | B29C 45/7207 264/237 |
| 2011/0076432 | A1 * | 3/2011 | Sakaguchi | B29C 49/6472 428/36.92 |
| 2011/0094186 | A1 * | 4/2011 | Chauvin | B29C 49/46 53/396 |
| 2011/0305789 | A1 * | 12/2011 | Neter | B29C 45/7207 425/547 |
| 2012/0091635 | A1 * | 4/2012 | Eberle | B29C 49/14 264/532 |
| 2012/0267381 | A1 * | 10/2012 | Trude | B29C 49/4802 220/675 |
| 2013/0106028 | A1 * | 5/2013 | Lisch | B29D 22/003 264/532 |
| 2014/0203481 | A1 * | 7/2014 | Derrien | B29C 49/12 264/532 |
| 2014/0300035 | A1 * | 10/2014 | Eberle | B29C 49/0073 264/529 |
| 2014/0367895 | A1 * | 12/2014 | Sato | B29C 49/12 264/532 |
| 2014/0374965 | A1 * | 12/2014 | Tanaka | B29C 49/14 264/523 |
| 2015/0076105 | A1 * | 3/2015 | Sato | B65D 1/0261 215/381 |

FOREIGN PATENT DOCUMENTS

| | | |
|---|---|---|
| JP | 2004-122457 A | 4/2004 |
| JP | 2011-527246 A | 10/2011 |
| JP | 2013-132884 A | 7/2013 |
| JP | 2013-208880 A | 10/2013 |

OTHER PUBLICATIONS

Jan. 18, 2019 Search Report issued in European Patent Application No. 16786090.7.
Aug. 21, 2018 Office Action issued in Japanese Patent Application No. 2015-093369.
Jun. 7, 2016 International Search Report issued in International Patent Application No. PCT/JP2016/001350.
Oct. 31, 2017 International Preliminary Report on Patentability issued in International Patent Application No. PCT/JP2016/001350.
Aug. 8, 2019 Office Action issued in Chinese Patent Application No. 201680024955.8.
Mar. 3, 2020 Office Action issued in Chinese Patent Application No. 201680024955.8.

* cited by examiner

LIQUID BLOW MOLDING APPARATUS AND LIQUID BLOW MOLDING METHOD

TECHNICAL FIELD

The present disclosure relates to a liquid blow molding apparatus and a liquid blow molding method both of which blow molds a resin-made preform into a container with a predetermined shape by using liquid.

BACKGROUND

As a blow molding apparatus that blow molds a resin-made preform into a container, Patent Literature 1, for example, describes a blow molding apparatus including a mold used for blow molding (hereinafter, called a blow mold), a stretching rod configured to stretch the preform, and a support pin configured to support the bottom of the preform from the outer side of the preform. The described blow molding apparatus is configured to stretch the preform in the axial direction by the stretching rod inserted into the preform and to supply pressurized air into the preform to stretch (expand) the preform in the radial direction while supporting the bottom of the preform by the support pin.

Other than the method of stretching the preform by supplying pressurized air into the preform as in the blow molding apparatus described in Patent Literature 1, the preform may be blow molded into a container by other existing methods, such as stretching the preform by supplying liquid into the preform (this method being called liquid blow molding). When such liquid blow molding is adopted to mold a container, there is the problem that the direction in which the preform is stretched and deformed is likely to be unstable due to behavior (e.g., the direction and strength of flow) of the liquid in the preform that has been supplied into the preform. For the above reason, it is needed especially in the liquid blow molding apparatus to increase stability during stretching and deformation by such a structure as the support pin described in Patent Literature 1.

CITATION LIST

Patent Literature

PTL 1: JP2004122457A

SUMMARY

Technical Problems

However, in the liquid blow molding apparatus as above, when the support pin is always in contact with the bottom of the preform in the state where the pre-heated preform is placed in the blow mold, the temperature of the bottom of the preform is decreased to accelerate curing due to the contact with the support pin. This might cause molding defects, such as failure to stretch the bottom sufficiently during blow molding and failure to achieve a desired container bottom thickness even after molding. Furthermore, when the blow mold is configured to be closed in the state where the support pin is in contact with the bottom of the preform after the preform is placed in the blow mold, the preform might be deviated from the desired position during mold closing. The result is that a liquid supplying nozzle might contact a mouth or the like of the preform when being displaced downward, thereby causing deformation, damage, or the like to the preform.

The present disclosure is therefore to propose a liquid blow molding apparatus and a liquid blow molding method both of which reduce the occurrence of mold defects in liquid blow molding by preventing a partial temperature drop in the preform and misalignment of the preform with respect to the blow mold during liquid blow molding of the preform and by preventing core misalignment at the time of supporting the preform by the support pin.

Solution to Problems

The present disclosure has been conceived to solve the above problems, and one of aspects of the present disclosure resides in a liquid blow molding apparatus that liquid blow molds a preform into a container in a blow mold, the preform having been formed in a bottomed tubular shape. The liquid blow molding apparatus includes a support pin disposed in the blow mold. The support pin includes a head configured to support a bottom of the preform from an outer side of the preform and a shaft that is connected to the head and that is displaceable upward and downward in an axial direction of the preform. The support pin is configured to define a gap between the head and the bottom of the preform in an ascended position where the preform is placed in the blow mold and where the support pin is displaced upward and is also configured to support the bottom of the preform at a time of a molding process and to be displaced downward in accordance with deformation of the preform caused by liquid blow molding.

In a preferred embodiment of the liquid blow molding apparatus of the present disclosure, the gap and a below-neck length that is an axial length from a lower surface of a neck ring to an end of the bottom of the preform satisfy the following formula (A): $0 < \text{gap} \leq 0.44 \times \text{below-neck length} \ldots$ (A)

In another preferred embodiment of the liquid blow molding apparatus of the present disclosure, the head is provided, at one end thereof that is configured to support the bottom of the preform, with a concave portion configured to receive at least part of the bottom of the preform and is also provided, on an outer side of the concave portion, with an inclined surface extending toward another end of the head in a manner such that the inclined surface spreads out like an open fan.

In yet another preferred embodiment of the liquid blow molding apparatus of the present disclosure, the liquid blow molding apparatus further includes a stretching rod configured to be inserted into the preform placed in the blow mold to stretch the preform in the axial direction.

In yet another preferred embodiment of the liquid blow molding apparatus of the present disclosure, at least one of the support pin and the stretching rod is configured to be always in contact with the bottom of the preform while liquid is supplied into the preform.

In yet another preferred embodiment of the liquid blow molding apparatus of the present disclosure, liquid is supplied after the bottom of the preform is sandwiched between the stretching rod and the support pin.

Another aspect of the present disclosure resides in a liquid blow molding method for liquid blow molding a preform into a container in a blow mold, the preform having been formed in a bottomed tubular shape. The liquid blow molding method includes using a liquid blow molding apparatus including a support pin disposed in the blow mold to support a bottom of the preform by the support pin at a time of a molding process and displace the support pin downward in accordance with deformation of the preform caused by liquid blow molding. The support pin includes a head configured to support the bottom of the preform from an outer side of the preform and a shaft that is connected to the head and that is displaceable upward and downward in an axial direction of the preform. The support pin is configured to define a gap between the head and the bottom of the preform in an ascended position where the preform is placed in the blow mold and where the support pin is displaced upward.

In a preferred embodiment of the liquid blow molding method of the present disclosure, the gap and a below-neck length that is an axial length from a lower surface of a neck ring to an end of the bottom of the preform satisfy the following formula (A): 0<gap≤0.44×below-neck length ... (A)

In another preferred embodiment of the liquid blow molding method of the present disclosure, the preform is stretched in the axial direction by using a stretching rod included in the liquid blow molding apparatus.

In yet another preferred embodiment of the liquid blow molding method of the present disclosure, at least one of the support pin and the stretching rod is configured to be always in contact with the bottom of the preform while liquid is supplied into the preform.

In yet another preferred embodiment of the liquid blow molding method of the present disclosure, liquid is supplied after the bottom of the preform is sandwiched between the stretching rod and the support pin.

Advantageous Effect

Provided are a liquid blow molding apparatus and a liquid blow molding method both of which reduce the occurrence of mold defects in liquid blow molding by preventing a partial temperature drop in the preform and misalignment of the preform with respect to the blow mold during liquid blow molding of the preform and by preventing core misalignment of the preform by the support pin.

DETAILED DESCRIPTION

Hereinafter, a preferred embodiment of the present disclosure will be described in detail based on the drawings. Although the following embodiment describes a liquid blow molding apparatus configured to mold a beverage container (bottle), the present disclosure is not limited to this embodiment. A liquid blow molding apparatus according to the present disclosure may be configured to mold a container containing any of a variety of content liquids, such as a cosmetic product, a pharmaceutical product, a detergent, and shampoo.

Figure 1:
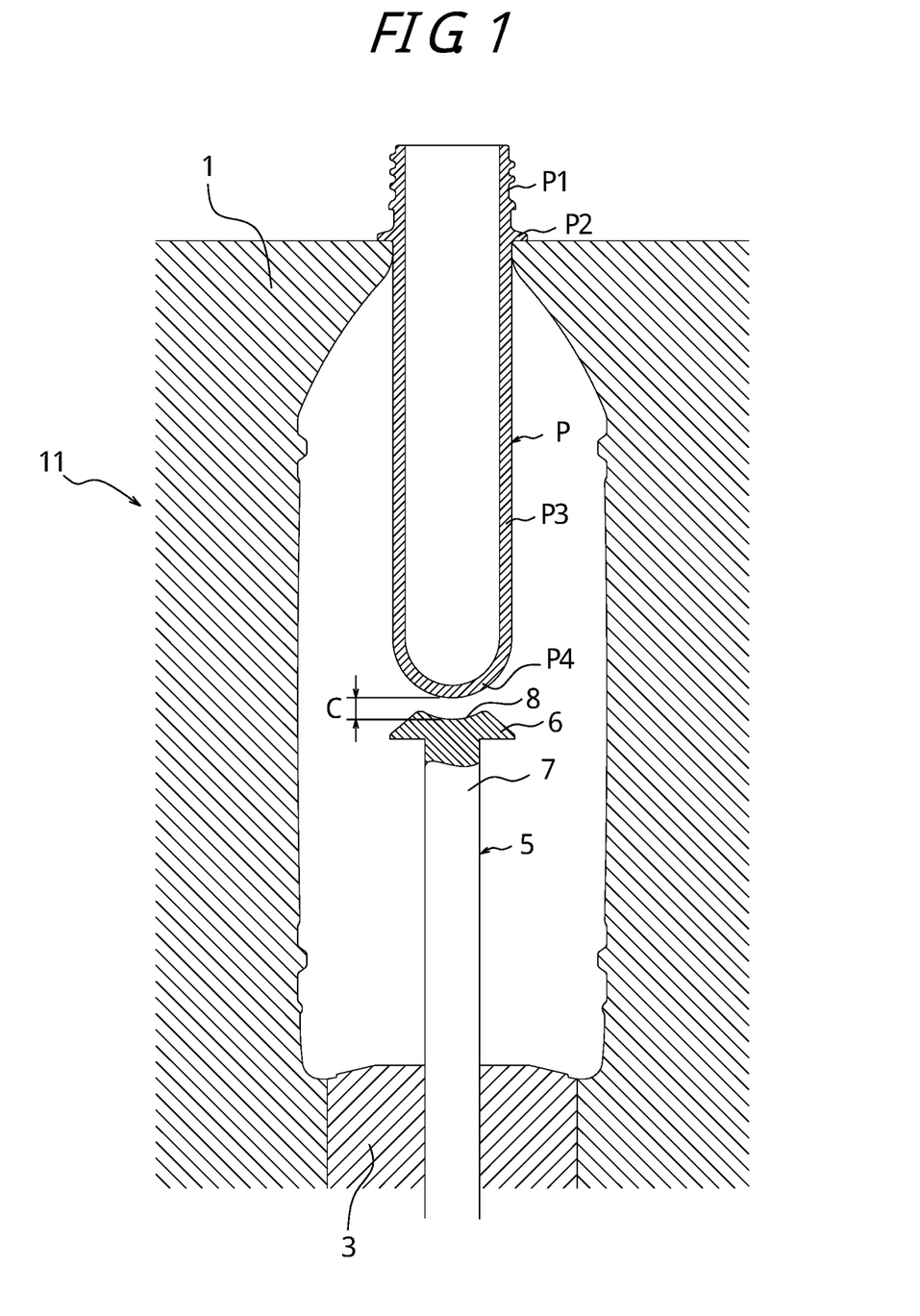
FIG. 1 illustrates an example of a liquid blow molding apparatus according to the present disclosure in the state where a preform is attached to the liquid blow molding apparatus.
Figure 2:
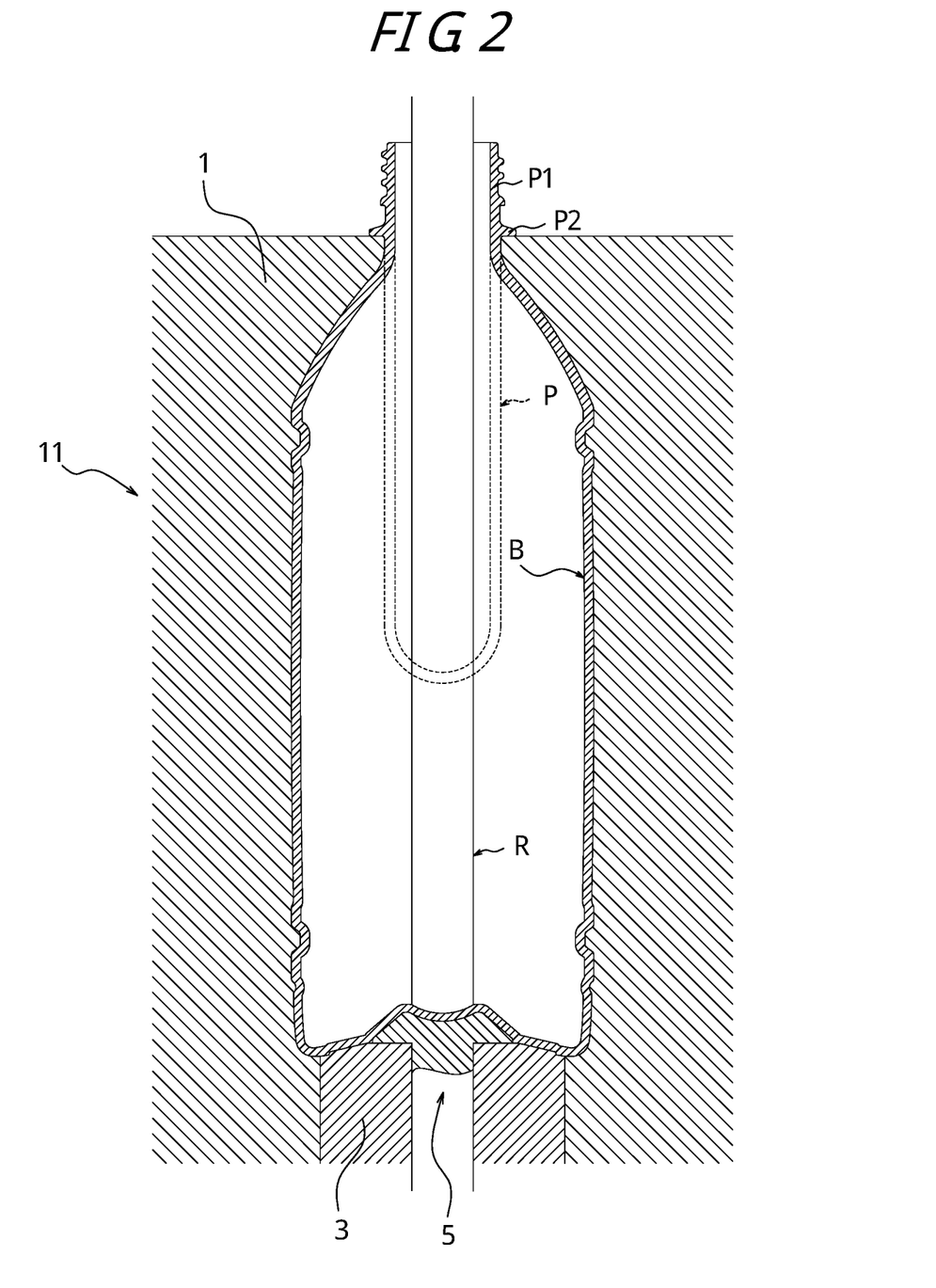
FIG. 2 illustrates an example of a liquid blow molding apparatus according to the present disclosure in the state where a preform has been liquid blow molded.

FIGS. 1 and 2 illustrate an example of a liquid blow molding apparatus configured to stretch a preform into a container by liquid blow molding. FIG. 1 illustrates the state where a preform P, which has been preformed in a bottomed tubular shape (test-tube shape) and heated, is attached to a liquid blow molding apparatus 11, and FIG. 2 illustrates the state where a container B has been molded by liquid blow molding from the state of FIG. 1.

The liquid blow molding apparatus 11 includes, as a blow mold, a main split mold 1 and a bottom mold 3. The liquid blow molding apparatus 11 further includes a support pin 5 inside the blow mold. The main split mold 1 sandwiches a lower side of a neck ring P2 and an upper end of a trunk P3 of the preform P. Additionally, the illustrated main split mold 1 and the bottom mold 3 are merely illustrative, and other configurations are also considered. For example, the main split mold 1 and the bottom mold 3 may be integrated.

The support pin 5 is disposed in the middle of the bottom mold 3. The support pin 5 includes a head 6, which is configured to support a bottom P4 of the preform P from the outer side of the preform P, and a shaft 7, which is connected to the head 6 and which is displaceable upward and downward in the axial direction of the preform P.

Figure 3:
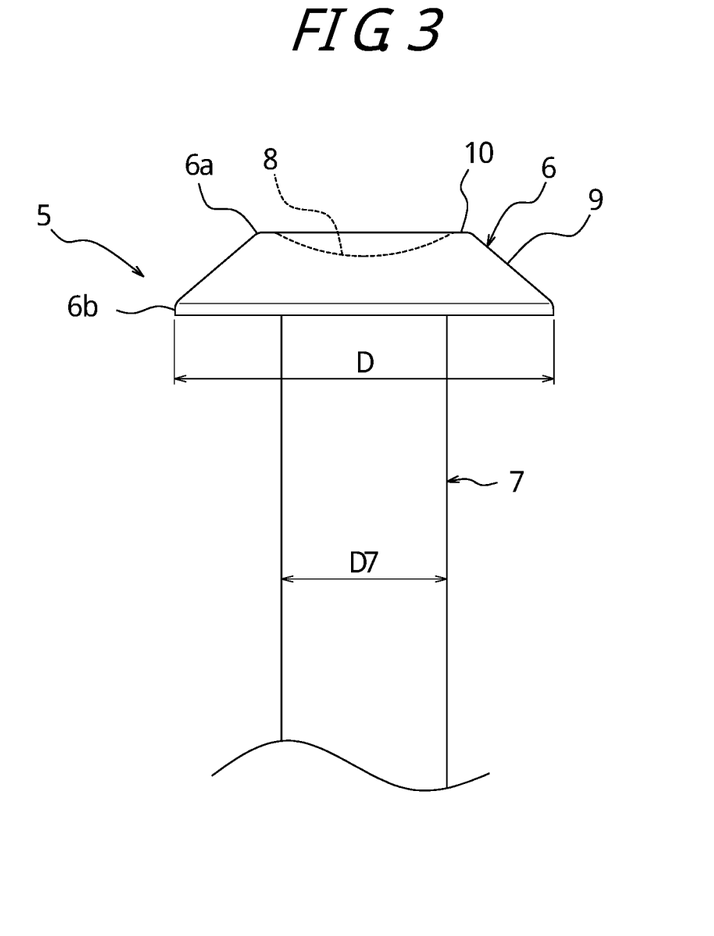
FIG. 3 is a partially enlarged view of a support pin included in a liquid blow molding apparatus according to the present disclosure.

As illustrated in a partially enlarged view of the support pin 5 in FIG. 3, the head 6 has an upper end 6a, which is configured to support the bottom P4 of the preform P, and a lower end 6b, which is connected to the shaft 7. The head 6 is provided in the middle thereof with a concave portion 8, which has a shape corresponding to the bottom P4 of the preform P and which is configured to receive at least a part of the bottom P4 of the preform P. The surface of the concave portion 8 is configured to conform to a curved outer surface of the bottom P4 of the preform P. The head 6 is further provided, on the outer side of the concave portion 8 in the radial direction, with a umbrella-shaped inclined surface 9, which extends toward the end 6b in a manner such that the inclined surface 9 spreads out like an open fan. Although in the present embodiment the head 6 and the shaft 7 are integrated, the head 6 and the shaft 7 may be formed as separate members. The shape of the support pin 5 may be altered as appropriate. For example, the support pin 5 may have a columnar shape having a flat upper surface or a shape having a convex upper surface. Furthermore, although the shape of the support pin 5 may confirm to the shape of the bottom P4 of the preform P, this is optional.

As illustrated in FIG. 1, the support pin 5 is configured to define a gap C between the head 6 and the bottom P4 of the preform P in the ascended position where the preform P is placed in the blow mold and where the support pin 5 is displaced upward. When the preform P is stretched in the axial direction by the gap C from the state of FIG. 1, the support pin 5 comes into contact with the bottom P4 of the preform P to start to support the bottom P4. That is to say, the support pin 5 is configured to support the bottom P4 of the preform P at the time of a molding process (during stretching). The support pin 5 is also configured to be displaced downward in accordance with the axial stretching and deformation of the preform P caused by liquid blow molding.

Here, to stretch the preform P in the present disclosure, it is preferable to use a stretching rod R as illustrated in FIG. 2. In cases where the stretching rod R is used, the preform P is stretched in the axial direction by pushing down the bottom P4 from the inner surface side by displacing the stretching rod R, which is disposed above the blow mold, downward in the axial direction and inserting the stretching rod R into the preform P through the mouth P1. By sandwiching the bottom P4 of the preform P by the stretching rod R and the support pin 5, the effect of preventing core misalignment is enhanced. After the axial stretching by the stretching rod R, liquid that has been pressurized to a predetermined pressure is supplied into the preform P through the mouth P1 of the preform P while the preform P is being stretched in the axial direction by the stretching rod R. By doing so, the preform P is stretched (expanded) in both the axis and the radial direction and blow molded into the state illustrated in FIG. 2.

Additionally, in cases where the stretching rod R is not used, the preform P may be stretched in the axial and the radial direction and blow molded into the state illustrated in FIG. 2 by supplying liquid that has been pressurized to a predetermined pressure into the preform P.

The support pin 5 is configured to be displaced downward toward the bottom mold 3 in accordance with the axial deformation (stretching) of the preform P caused by blow molding, that is, in accordance with the pressure of the stretching rod R and the pressure of liquid inside the preform P. Herein, the liquid blow molding apparatus 11 preferably includes a resistance providing means (which is not illustrated) configured to provide resistance to the preform P when the support pin 5 is displaced downward. Examples of the resistance providing means may include a servo motor, a hydraulic means, a spring, and an air cylinder. By thus providing the resistance providing means, stretching in the axis and the radial direction may be controlled in cases where the stretching rod R is not used. Additionally, from the state illustrated in FIG. 2, the container B is subjected to heat treatment operations, such as predetermined heat setting in the blow mold and cooling, and subsequently to mold opening, such as opening of the main split mold 1 and a mold releasing process and then, removed as a product.

In the present disclosure, owing to the configuration in which the gap C is defined between the head 6 and the bottom P4 of the preform P in the state where the preform P is placed in the blow mold and where the support pin 5 is displaced upward, a local temperature drop in the preform P placed in the blow mold is reduced. As a result, the molded container B is formed to have a desired thickness, and molding defects are reduced. Herein, if the support pin 5 contacts the bottom of the preform P when the preform P is placed in the blow mold, the preform P may be pinched by the mold during mold closing in the contacting state. Furthermore, if the contacting state occurs after mold closing, the liquid supplying nozzle may come into contact with the mouth P1 or the like of the preform P, thereby causing deformation, damage, or the like to the preform P when the preform P is being protruded toward the outer side of mold and when the liquid supplying nozzle is being displaced downward. However, according to the present disclosure, providing the gap C prevents misalignment of the preform P in the axial direction, and accordingly, there is no possibility of the aforementioned pinching of the preform P by the mold and the deformation, damage, or the like to the preform P due to contact with the nozzle.

Furthermore, in the present disclosure, providing the head 6 of the support pin 5 with the concave portion 8, which is configured to receive the bottom P4 of the preform P, prevents core misalignment in which the center position is deviated in the radial direction when the preform P is stretched. Moreover, providing the head 6 of the support pin 5 with the umbrella-shaped inclined surface 9, which extends to spread out like an open fan, prevents the problem that would arise in cases where the support pin 5 is composed only of the shaft 7, that is, the problem that resin may flow around down to (may be caught in) a side surface of the shaft 7, thereby reducing the occurrence of molding defects, such as thickness variation (thickness deviation), breakage, and wrinkles, in the bottom of the container B.

Figure 5:
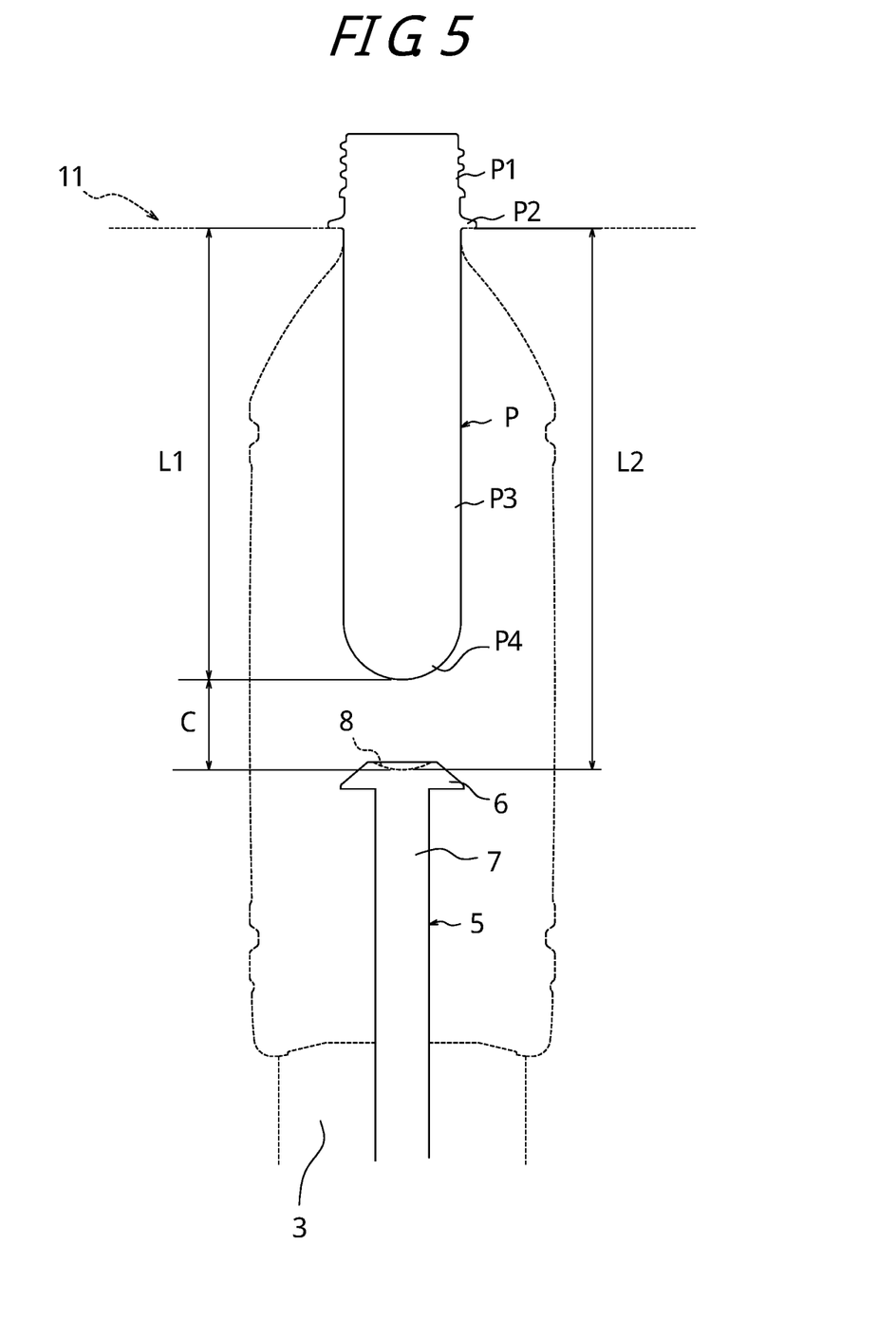
FIG. 5 illustrates an experiment using a liquid blow molding apparatus according to the present disclosure.

Additionally, from the perspectives of setting a distance by which the preform P placed in the blow mold is surely prevented from contacting the support pin 5 and of preventing core misalignment, the gap C is preferably as close to 0 mm as possible, while a variation in dimension of the preform P in molding and a change in dimension of the preform P due to heating are to be taken into consideration. When the gap C is too large, it becomes too late when the bottom P4 is started to be supported by the support pin 5 at the time of stretching and deformation of the preform P, and this makes it difficult to exert the effect of preventing core misalignment. Accordingly, the gap C is preferably 0.44 times or less the axial length (below-neck length) L1 (mm) (refer to FIG. 5) from the neck ring P2 to an end of the bottom P4 in the preform P.

Furthermore, in the liquid blow molding apparatus 11 according to the present disclosure, at least one of the support pin 5 and the stretching rod R is preferably configured to be always in contact with the bottom P4 of the preform P while liquid is being supplied into the preform P. Depending on conditions, such as the filling rate, amount, and timing, of the liquid supply into the preform P, the stretching rod R may come off from an inner surface of the bottom P4 of the preform P in the middle of liquid blowing. Even in such cases, core misalignment is prevented by the support pin 5 being always in contact with the bottom P4 of the preform P. From the same perspective, in cases where the stretching rod R is used, it is preferable to supply liquid after the bottom P4 of the preform P is sandwiched between the stretching rod R and the support pin 5. With the above configuration, the preform P is stretched and deformed easily in the state where the bottom P4 is sandwiched between the stretching rod R and the support pin 5, and the effect of preventing core misalignment is further enhanced.

As liquid supplied into the preform P, a content liquid, such as a beverage, that is to be contained in the container B as a final product may be used. By doing so, the process of supplying the content liquid to the container B may be omitted, and the production process and the configuration of the blow molding apparatus may be simplified.

Furthermore, in the liquid blow molding apparatus 11 according to the present disclosure, blow molding may be achieved without using the stretching rod R. In cases where the stretching rod R is used, blow liquid is flown to the mouth P1 of the preform P through an area obtained by deducting a sectional area of the stretching rod R from an opening area of the mouth P1 of the preform P. On the other hand, in cases where the stretching rod R is not used, blow liquid is flown through the entire opening area of the mouth P1 of the preform P. Accordingly, the pressurization rate may be increased, and consequently, molding time may be reduced.

Furthermore, with reference to FIG. 3, the diameter D of an edge portion of the inclined surface 9 on the side of the end 6b is preferably greater than the diameter D7 of the shaft 7. The above configuration further prevents the problem that resin of the preform P may flow around down to the side surface of the shaft 7.

Furthermore, the head 6 is preferably provided with an annular flat portion 10, which is formed between the concave portion 8 and the inclined surface 9. The above configuration eliminates the presence of a portion protruding at an acute angle in the head 6 and also eliminates the presence of a portion depressed at an acute angle in the bottom of the container B molded by using the head 6. This allows the bottom P4 of the preform P to conform to an upper surface of the head 6 smoothly at the time of blow molding and stabilizes the shape of the bottom of the container B resulting from blow molding and improves strength of the bottom of the container B.

Figure 4A:
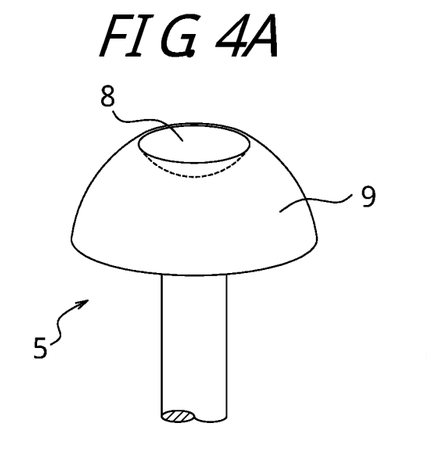
FIGS. 4A to 4E illustrate various modifications of a support pin included in a liquid blow molding apparatus according to the present disclosure.
Figure 4B:
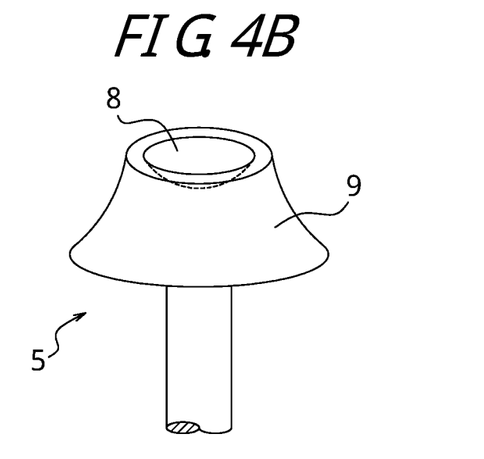
Figure 4C:
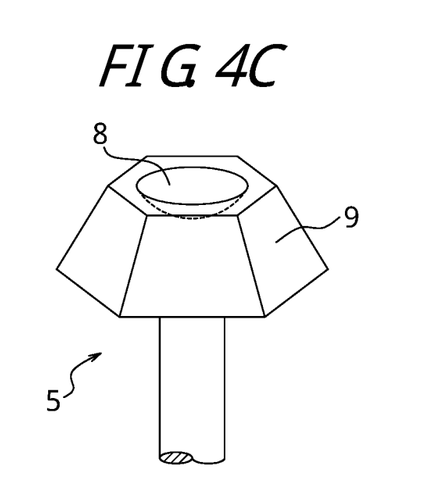
Figure 4D:
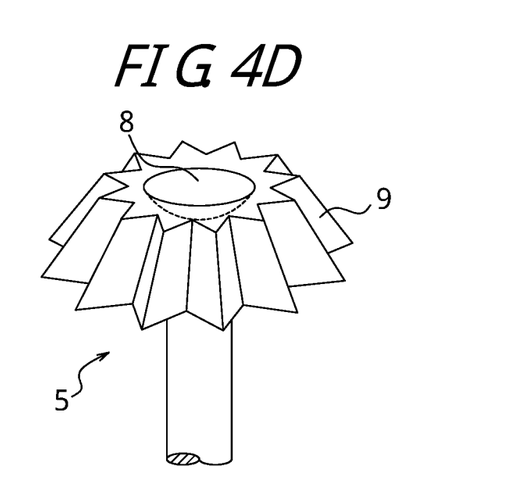

Next, with reference to FIGS. 4A to 4E, various modifications of the support pin 5 are described. As illustrated in FIG. 4A, the head 6 of the support pin 5 may be shaped in a reversed bowl shape, and the inclined surface 9 may be formed as a curved surface having a curvature whose center lies within the head 6. Alternatively, as illustrated in FIG. 4B, the inclined surface 9 may be formed as a curved surface having a curvature whose center lies outside the head 6. Furthermore, other than the shapes (truncated cone shapes) obtained by removing top portions from conical shapes as in the aforementioned examples, the head 6 may be shaped in a shape (truncated pyramidal shape) obtained by removing a top portion from a pyramidal shape as illustrated in FIG. 4C. Although FIG. 4C illustrates a hexagonal pyramid, the number of side surfaces may be determined at will. Moreover, as illustrated in FIG. 4D, the inclined surface 9 may be shaped like an umbrella gear.

Figure 4E:
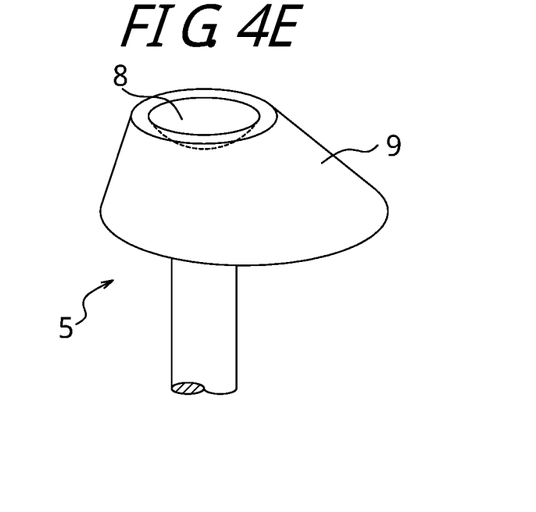

Furthermore, although the concave portion 8 is formed at the center of the head 6 in the aforementioned examples, as illustrated in FIG. 4E, the concave portion 8 may be formed at a position eccentric from the center of the head 6. That is to say, as long as the center axis of the preform P is aligned with the center axes of the concave portion 8 and the shaft 7, the inclined surface 9 may be disposed to be eccentric as illustrated in FIG. 4E.

Next, a description is given of experiments conducted to confirm a preferable range of the gap C in the present disclosure. Containers B were molded from preforms P by liquid blow molding under different conditions by using the liquid blow molding apparatus 11 according to the present disclosure, and whether the molded containers B had desired dimensions was confirmed. Table 1 depicts the volumes (ml) of the molded containers B, axial lengths (below-neck lengths) L1 (mm) (refer to FIG. 5) from the neck rings P2 to the ends of the bottoms P4 of the preforms P, the gaps C (mm) between the preforms P and the support pin 5 when the preforms P were placed in the blow mold, lengths L2 (mm) (refer to FIG. 5) obtained by summing the lengths L1 and the gaps C, draw ratios in the axial direction, and confirmation results after liquid blow molding. Note that a draw ratio in the axial direction refers to a ratio between the length L1 before blow molding and the length L2, which is obtained by summing the length L1 and the gap C, and represents how much the preform P is stretched in the axial direction before the preform P comes into contact with the support pin 5. The results of Table 1 are defined as "good" when molding into substantially desired dimensions was achieved although a slight variation in dimensions and core misalignment within a range tolerable at the product level occurred and are defined as "very good" when molding at an even higher dimensional accuracy was achieved.

TABLE 1

| | Container volume | | | | | | |
|---|---|---|---|---|---|---|---|
| | 360 ml | 360 ml | 950 ml | 950 ml | 950 ml | 950 ml | 950 ml |
| Below-neck length L1 (mm) | 62.5 | 49.6 | 62.5 | 95.8 | 86.8 | 79.3 | 49.6 |
| Gap C (mm) | 8.5 | 21.4 | 43.0 | 9.7 | 18.7 | 26.2 | 55.9 |
| Length L2 (mm) | 71.0 | 71.0 | 105.5 | 105.5 | 105.5 | 105.5 | 105.5 |
| Draw ratio in axial direction | 1.14 | 1.43 | 1.69 | 1.10 | 1.22 | 1.33 | 2.13 |
| Result | Very good | Very good | Good | Very good | Very good | Very good | Good |

From the results of Table 1, it has been confirmed that the effect by the support pin 5 of preventing core misalignment at the time of liquid blow molding is more likely to be observed and the containers B of desired shapes are molded at a high dimensional accuracy when the gap C is $0 < C \geq 0.44 \times L1$.

INDUSTRIAL APPLICABILITY

The present disclosure provides a liquid blow molding apparatus and a liquid blow molding method both of which reduce mold defects by preventing core misalignment and by preventing a partial temperature drop in the preform and misalignment of the preform with respect to the blow mold during molding of the preform.

REFERENCE SIGNS LIST

1 Main split mold
3 Bottom mold
5 Support pin
6 Head
7 Shaft
8 Concave portion
9 Inclined surface
10 Flat portion
11 Liquid blow molding apparatus
B Container
C Gap
P Preform
P1 Mouth
P2 Neck ring
P3 Trunk
P4 Bottom
R Stretching rod

The invention claimed is:

1. A liquid blow molding method for liquid blow molding a preform into a container in a blow mold and supplying a liquid that has been pressurized to a predetermined pressure into the preform, the preform having been formed in a bottomed tubular shape, the liquid blow molding method comprising:
   using a liquid blow molding apparatus comprising a support pin disposed in the blow mold to
   support a bottom of the preform by the support pin by contacting a head of the support pin and the bottom of the preform at a time of a molding process when the preform is stretched in an axial direction of the preform and displace the support pin downward in accordance with deformation of the preform caused by liquid blow molding, wherein the support pin includes the head configured to support the bottom of the preform from an outer side of the preform and a shaft that is connected to the head and that is displaceable upward and downward in the axial direction of the preform, the support pin is configured to define a gap between the head and the bottom of the preform, the head and the preform spaced from each other when the preform is in a most ascended position where the preform is placed in the blow mold and the support pin is displaced most upward prior to stretching the preform and the support pin is configured to support the bottom of the preform when the preform is stretched by an amount of the gap in the axial direction, and the gap and a below-neck length that is an axial length from a lower surface of a neck ring to an end of the bottom of the preform satisfy the following formula (A):

0<gap≤0.44×below-neck length . . . (A).

2. The liquid blow molding method of claim 1, wherein the preform is stretched in the axial direction by using a stretching rod included in the liquid blow molding apparatus, and the stretching rod is inserted into the inside of the preform to stretch the preform in the axial direction.

3. The liquid blow molding method of claim 2, wherein the stretching rod is configured to be in contact with the bottom of the preform while the liquid is supplied into the preform.

4. The liquid blow molding method of claim 2, wherein the liquid is supplied after the bottom of the preform is sandwiched between the stretching rod and the head of the support pin.

* * * * *